United States Patent
Sbandi et al.

(10) Patent No.: US 11,599,886 B2
(45) Date of Patent: Mar. 7, 2023

(54) SYSTEM FOR IMPETUS RESOURCE DISTRIBUTION PROCESS CONFIRMATION WITH WEARABLE DEVICE INTEGRATION

(71) Applicant: BANK OF AMERICA CORPORATION, Charlotte, NC (US)

(72) Inventors: Michael Sbandi, Charlotte, NC (US); Jo-Ann Taylor, Godalming (GB); Michael Robert Young, Davidson, NC (US)

(73) Assignee: BANK OF AMERICA CORPORATION, Charlotte, NC (US)

(*) Notice: Subject to any disclaimer, the term of this patent is extended or adjusted under 35 U.S.C. 154(b) by 565 days.

(21) Appl. No.: 16/745,766

(22) Filed: Jan. 17, 2020

(65) Prior Publication Data
US 2021/0224804 A1    Jul. 22, 2021

(51) Int. Cl.
*G06Q 20/40* (2012.01)
*G06N 20/00* (2019.01)
*H04L 9/40* (2022.01)
*G06N 5/025* (2023.01)
*G06F 1/16* (2006.01)

(52) U.S. Cl.
CPC .......... *G06Q 20/405* (2013.01); *G06N 5/025* (2013.01); *G06N 20/00* (2019.01); *H04L 63/0853* (2013.01); *G06F 1/163* (2013.01)

(58) Field of Classification Search
CPC ............ G06Q 20/405; G06Q 20/321; G06Q 20/4012; G06Q 20/4016; G06N 20/00; G06N 5/025; G06N 5/04; H04L 63/0853; G06F 1/163; G06F 2221/2111; G06F 2221/2137; G06F 3/015; G06F 21/32; H04W 12/065; H04W 12/33; H04W 12/68
See application file for complete search history.

(56) References Cited

U.S. PATENT DOCUMENTS

| | | | |
|---|---|---|---|
| 6,492,897 B1* | 12/2002 | Mowery, Jr. | ............. H04B 3/54 340/505 |
| 6,609,114 B1* | 8/2003 | Gressel | ................ G06Q 20/105 705/50 |
| 8,417,584 B2 | 4/2013 | Ross | |
| 8,715,178 B2 | 5/2014 | Price et al. | |
| 9,177,307 B2 | 11/2015 | Ross et al. | |

(Continued)

OTHER PUBLICATIONS

Impact Brief, The Thrill of Impulse Savings, Center for Financial Services Information; Piggy Mojo; https://s3.amazonaws.com/cfsi-innovation-files/wp-content/uploads/2017/01/31040529/Piggy-Mojo_Impact_April2013.pdf.

*Primary Examiner* — Atique Ahmed
(74) *Attorney, Agent, or Firm* — Moore & Van Allen PLLC; Nicholas C. Russell

(57) ABSTRACT

Embodiments of the invention are directed to a system, method, or computer program product for integration with a wearable device for impetus resource distribution process confirmation and authentication. In this way, the invention coordinates with a wearable device and resource distribution vehicles of a user. Upon activation of a resource distribution vehicle, the system reviews metrics from the wearable device to identify discrepancies between the real-time metrics and a baseline for the user. The invention triggers tiered confirmation requests for authentication prior to allowing processing of the resource distribution for impetus distribution prevention.

20 Claims, 6 Drawing Sheets

(56) References Cited

U.S. PATENT DOCUMENTS

| | | | |
|---|---|---|---|
| 9,754,318 B1 | 9/2017 | Spies et al. | |
| 10,210,569 B1 | 2/2019 | Kim et al. | |
| 10,467,327 B1* | 11/2019 | Arazi | G06Q 30/02 |
| 10,991,242 B2* | 4/2021 | Taylor | H04Q 9/00 |
| 2012/0190386 A1* | 7/2012 | Anderson | H04L 67/306 |
| | | | 455/456.3 |
| 2012/0296768 A1 | 11/2012 | Fremont-Smith et al. | |
| 2014/0164057 A1 | 6/2014 | Wen et al. | |
| 2014/0244503 A1 | 8/2014 | Sadlier | |
| 2015/0120555 A1* | 4/2015 | Jung | G06Q 50/01 |
| | | | 705/44 |
| 2015/0363481 A1* | 12/2015 | Haynes | G06Q 10/10 |
| | | | 707/748 |
| 2017/0195994 A1 | 7/2017 | Cole et al. | |
| 2017/0289134 A1* | 10/2017 | Bradley | H04L 63/105 |
| 2020/0293116 A1* | 9/2020 | Udall | G01V 1/001 |
| 2020/0314910 A1* | 10/2020 | Höglund | H04W 48/10 |

\* cited by examiner

SYSTEM FOR IMPETUS RESOURCE DISTRIBUTION PROCESS CONFIRMATION WITH WEARABLE DEVICE INTEGRATION

BACKGROUND

Currently users have a wide variety of resource distribution requirements and personal experiences. In some instances, users perform impetus resource distributions. This phenomenon is demonstrated in many users via physiological changes in real-time based one the impetus distribution. As such, a need exits for an impetus resource distribution process confirmation network.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatuses (e.g., a system, computer program product and/or other devices) and methods for wearable device integration of an impetus resource distribution process confirmation prior to allowing completion of a resource distribution.

Embodiments of the invention are directed to a system, method, or computer program product for integration with a wearable device for impetus resource distribution process confirmation and authentication. In this way, the invention coordinates with a wearable device and resource distribution vehicles of a user. Upon activation of a resource distribution vehicle, the system reviews metrics from the wearable device to identify discrepancies between the real-time metrics and a baseline for the user. The invention triggers tiered confirmation requests for authentication prior to allowing processing of the resource distribution for impetus distribution prevention.

Embodiments of the invention comprise systems, methods, and computer program products for impetus resource distribution process confirmation, the invention comprising: identifying and integrating within a deployed wearable device on a user; identifying and integrating within user resource distribution vehicles; synchronizing the deployed wearable device and the user resource distribution vehicles; identifying activation of one of the user resource distribution vehicles; extracting physiological response data from the deployed wearable device on the user in real-time as activation of the user resource distribution vehicle is occurring; comparing the extracted physiological response data to a baseline physiological response data to determine a discrepancy; comparing the activation of the user resource distribution vehicles to user control rules; triggering a process confirmation confirming the activation based on a discrepancy between the comparisons; requiring confirmation for completion of resource distribution via the user resource distribution vehicle; and building learned user resource distribution platform based on machine learning composition of the activation and confirmation over a period of time.

In some embodiments, identifying and integrating within the deployed wearable device on the user further comprises generating a baseline of physiological responses of the user based on sensors associated with the wearable device.

In some embodiments, identifying and integrating within the deployed wearable device on the user further comprises requiring the user to opt-in for the identification.

In some embodiments, the user control rules further comprise user pre-set rules including a threshold resource distribution amount or a time of day for the activation for triggering process confirmation.

In some embodiments, the built learned user resource distribution platform further comprises creation of a threshold discrepancy differences between the comparisons that triggers the required confirmation and wherein the built learned user resource distribution platform further comprises creation of the user control rules.

In some embodiments, identifying activation of one of the user resource distribution vehicles further comprises identifying deployment of the user resource distribution vehicle at a merchant for completing a transaction for a product or service and information about the transaction including a resource distribution amount, a location, and a time of the activation.

In some embodiments, the user control rules further comprise system pre-set rules based on user resource allocation and user resource distribution requirements.

In some embodiments, deploying the wearable device to one or more users further comprises deploying an electronic watch with an interactive interface for communication with other wearable devices across the entity, wherein the user is an associate engaged in obligations for the entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
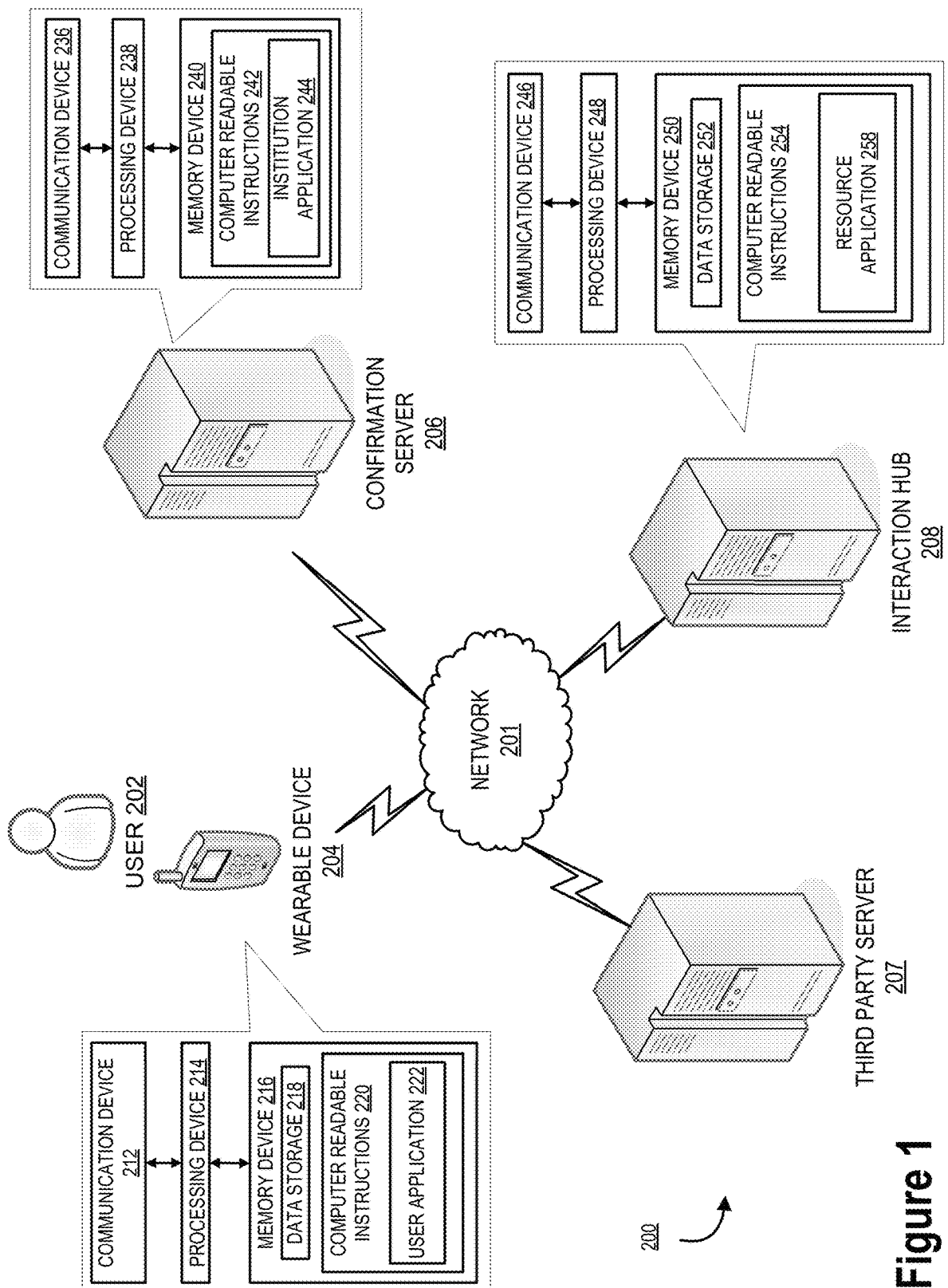
Figure 2:
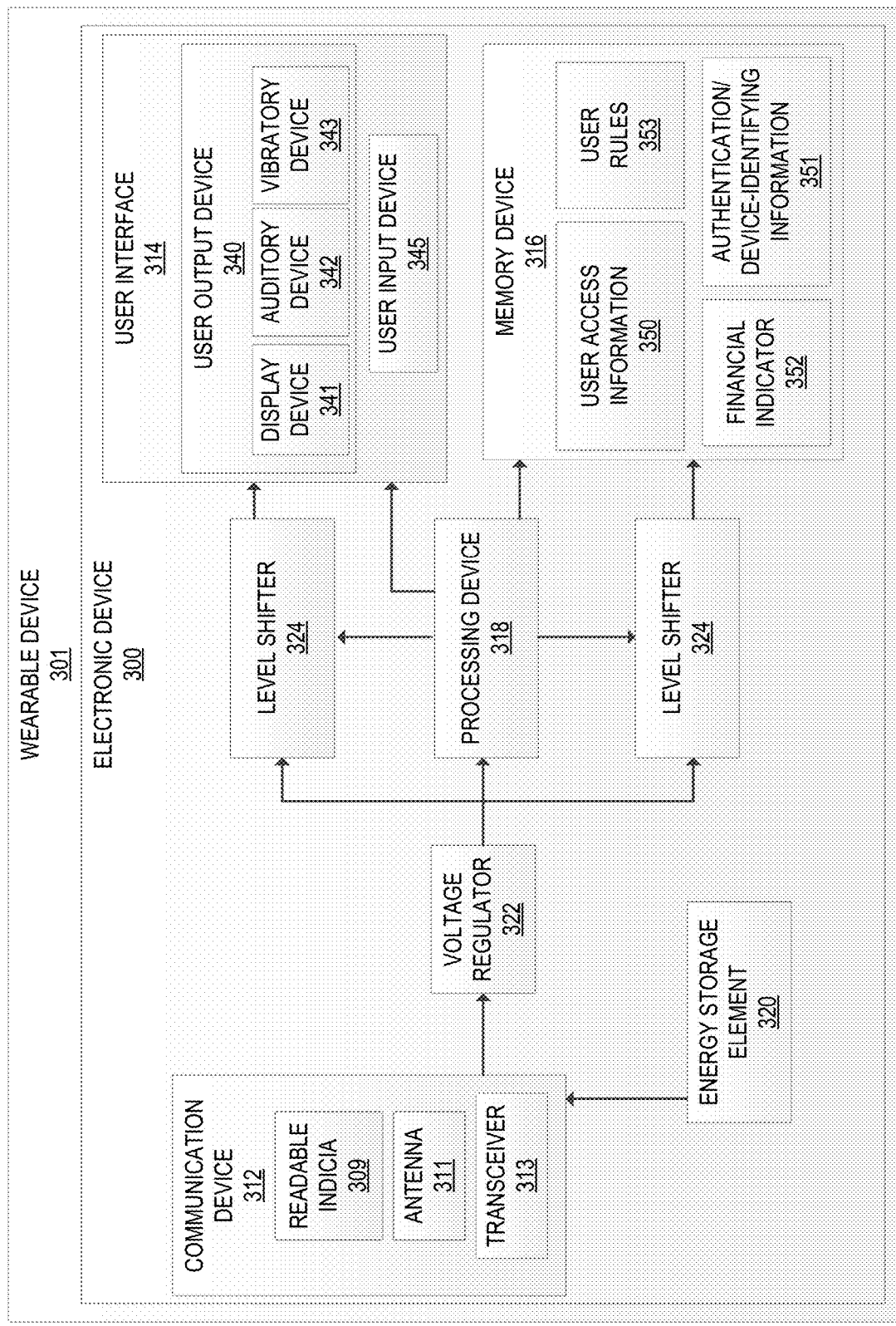
Figure 3:
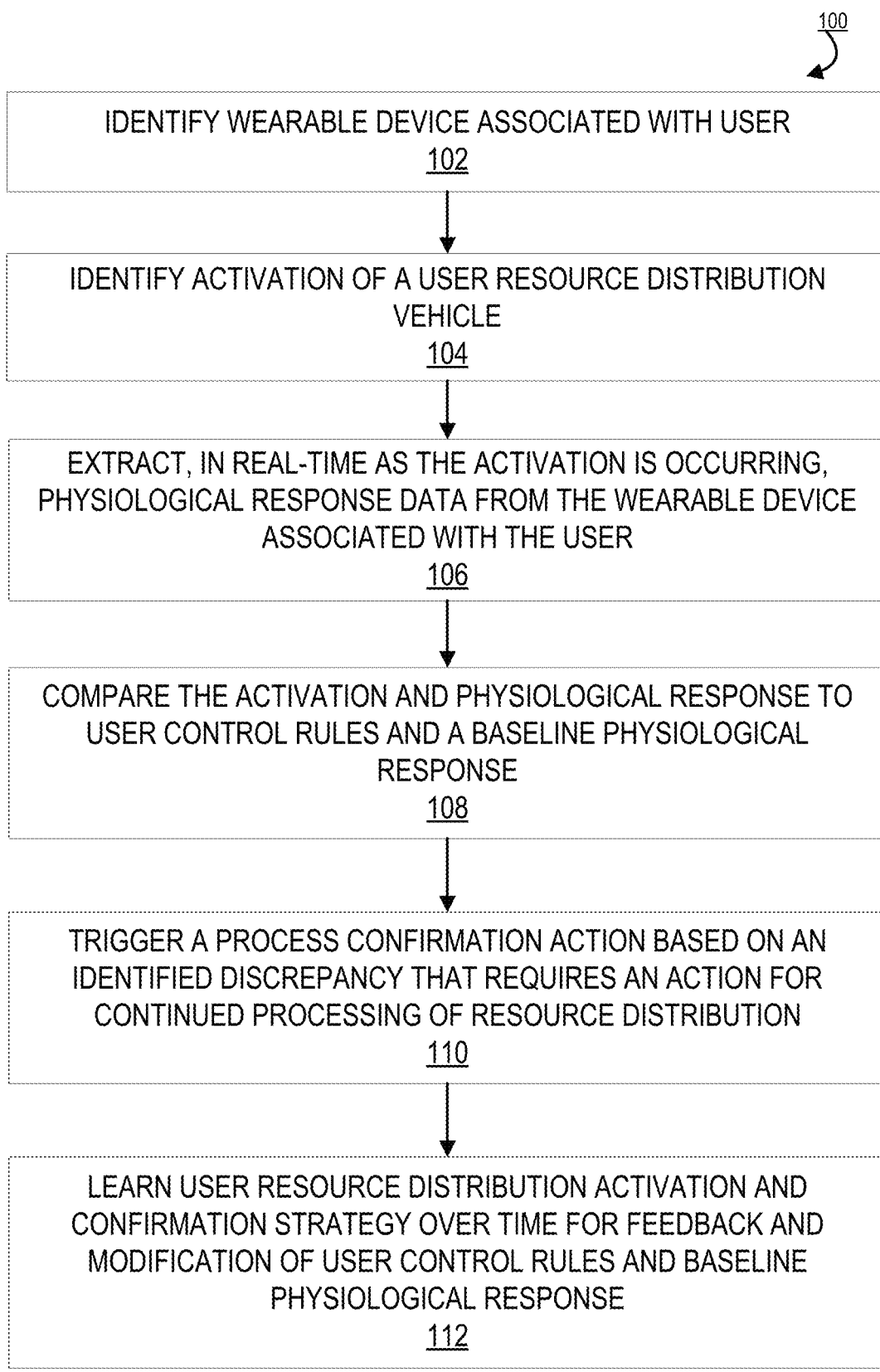
Figure 4:
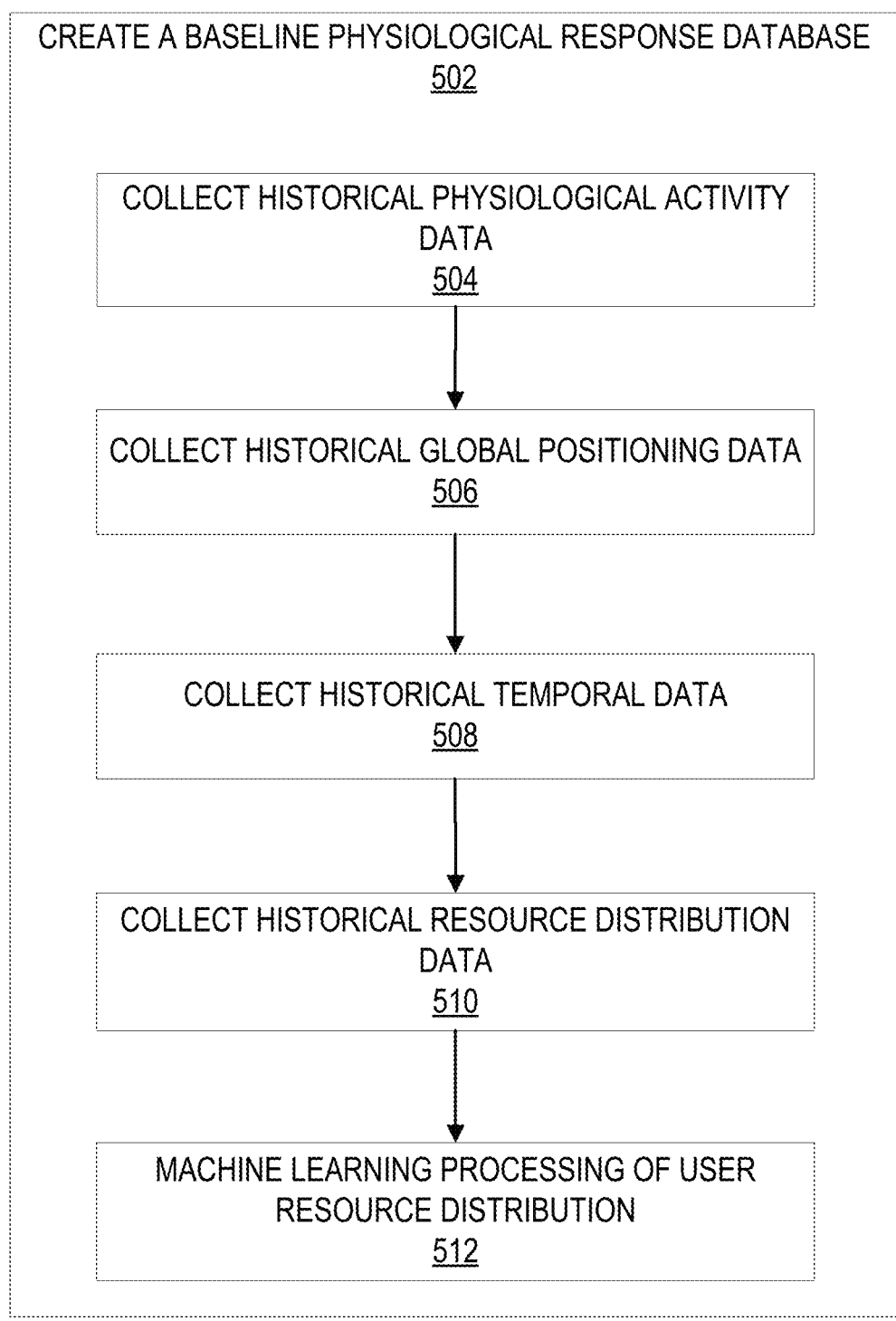
Figure 5:
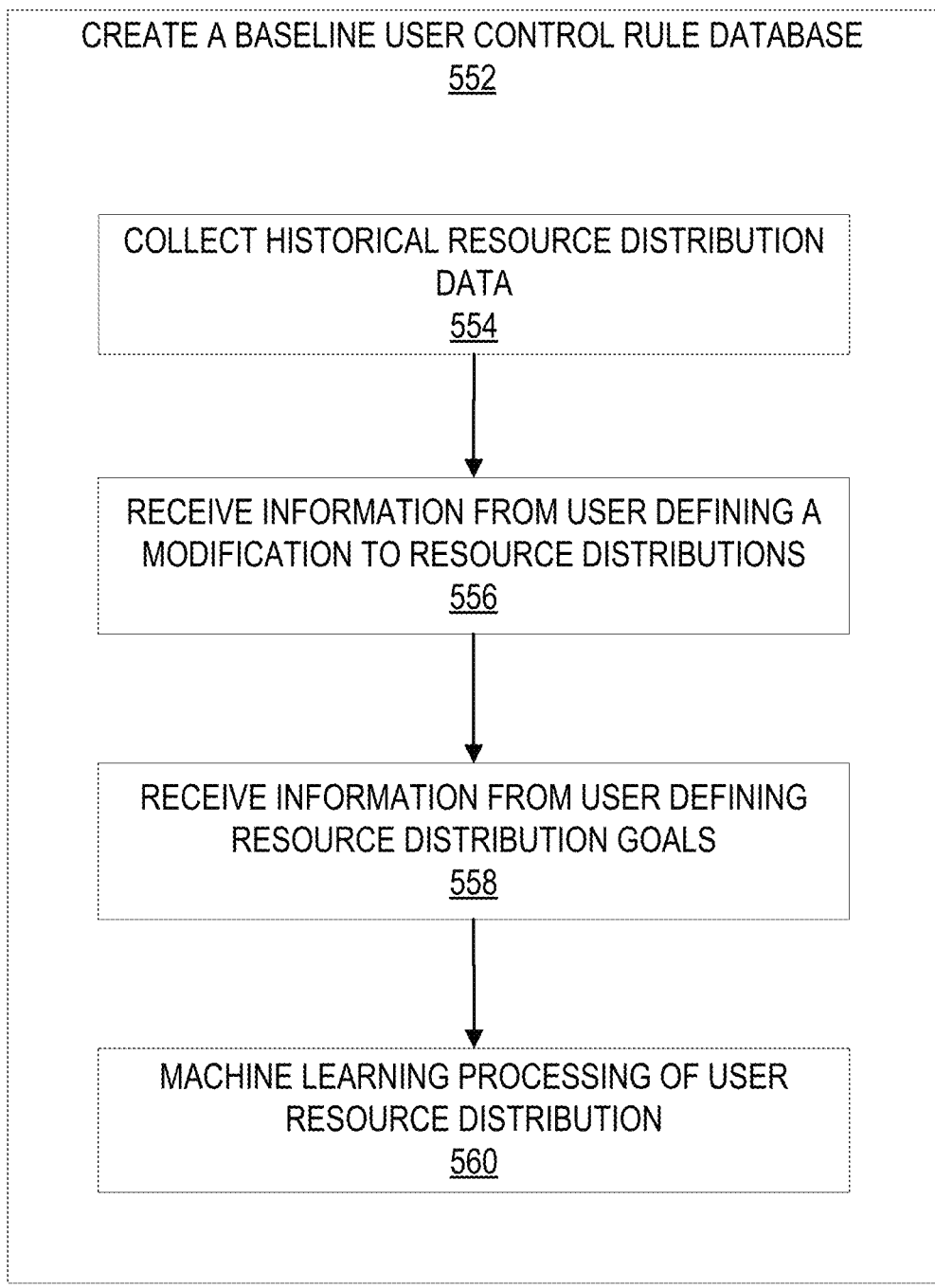
Figure 6:
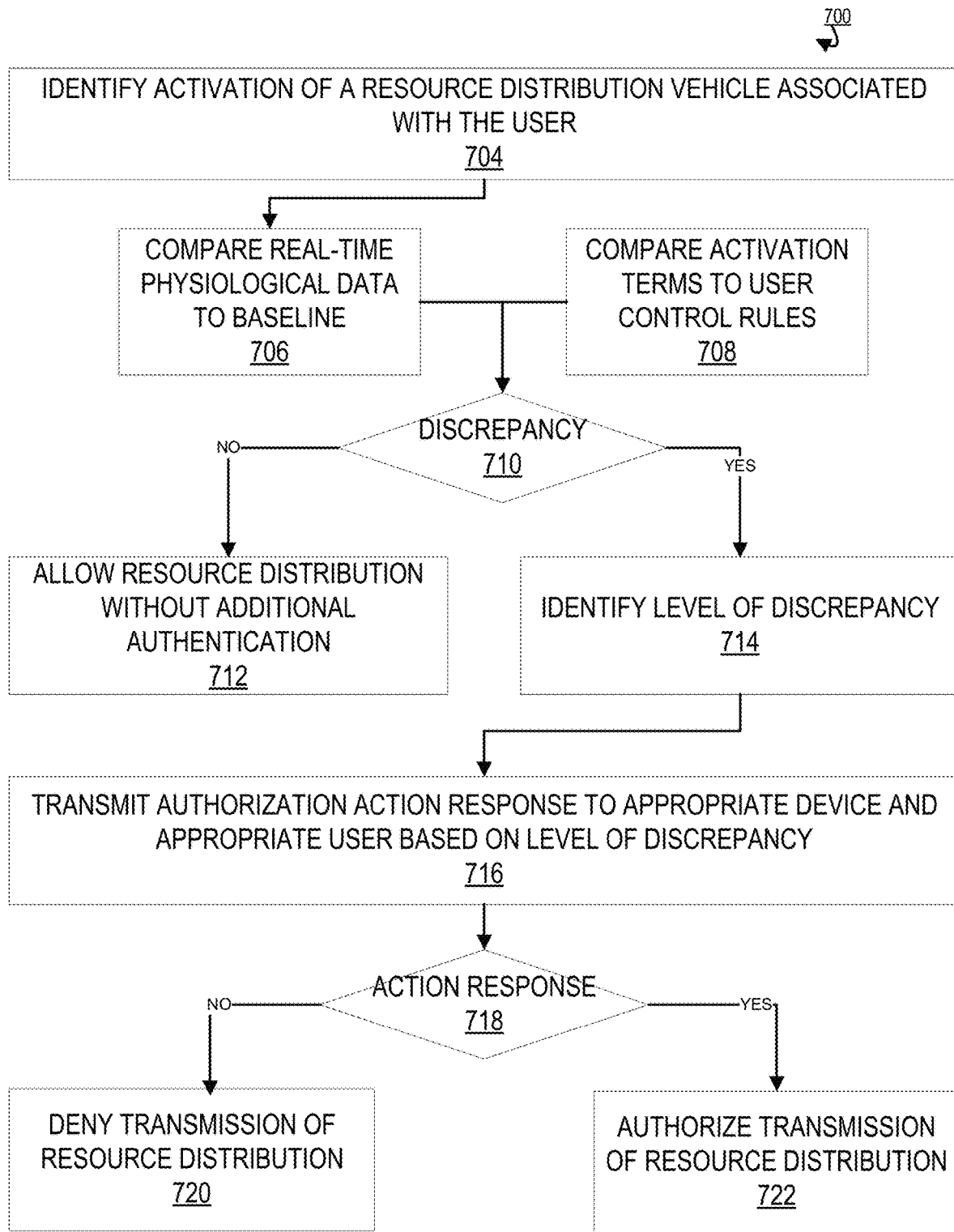

Having thus described embodiments of the invention in general terms, reference will now be made to the accompanying drawings, wherein:

FIG. 1 provides an impetus resource distribution processing confirmation system environment, in accordance with one embodiment of the present invention;

FIG. 2 provides a system diagram for a wearable device, in accordance with one embodiment of the present invention;

FIG. 3 provides a high level process flow illustrating the impetus resource distribution process confirmation, in accordance with one embodiment of the present invention;

FIG. 4 provides a high level process flow illustrating creating a baseline physiological resource database, in accordance with one embodiment of the present invention;

FIG. 5 provides a high level process flow illustrating creating a baseline user control rule database, in accordance with one embodiment of the present invention; and FIG. 6 provides a process map illustrating the impetus resource distributing confirmation process, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A wearable device as used herein may refer to and is configured to be worn on the body. In some embodiments, the wearable device is a watch. The wearable device is configured for wearing on various body such as the wrist or ankle or the like. In other embodiments, the wearable device is or includes a charm wearable on a chain around the neck, ankle or wrist or is or includes a necklace. In other embodiments, the wearable device is or includes one or more rings, a wristwatch or incorporated into eyeglass rims, eyeglasses, such as embedded in and/or on eyeglass lenses, contact lenses, shoes, purse, wallet, a cap, a hat, a visor, a shoelace, a button, a belt, a belt buckle, an implant, or some other clothing accessory or personal accessory worn or carried on a user's person. In some embodiments, the wearable device is a headphone or wireless headphone with audio receiving capabilities.

Resources, as used herein may include money, funds, or the like used as tender for exchange for a product or service. The resources may be associated with accounts, entity data, entity locations, or the like.

FIG. 1 illustrates an impetus resource distribution processing confirmation system environment 200, in accordance with one embodiment of the present invention. FIG. 1 provides the system environment 200 for which the distributive network system with specialized data feeds for wearable device integration into user employment.

As illustrated in FIG. 1, the interaction hub 208 is operatively coupled, via a network 201 to the wearable device 204, third party server 207, and the confirmation server 206. In this way, the interaction hub 208 can send information to and receive information from the wearable device 204 and the confirmation server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that has a wearable device 204. FIG. 1 also illustrates a wearable device 204. The wearable device 204 may be configured to be worn on the body. In some embodiments, the wearable device 204 is a watch. The wearable device 204 is configured for wearing on various body such as the wrist or ankle or the like. In other embodiments, the wearable device 204 is or includes a charm wearable on a chain around the neck, ankle or wrist or is or includes a necklace. In other embodiments, the wearable device is or includes one or more rings, a wristwatch or incorporated into eyeglass rims, eyeglasses, such as embedded in and/or on eyeglass lenses, contact lenses, shoes, purse, wallet, a cap, a hat, a visor, a shoelace, a button, a belt, a belt buckle, an implant, or some other clothing accessory or personal accessory worn or carried on a user's person. The wearable device 204 is further illustrated below in FIG. 3, but generally comprises a communication device 212, a processing device 214, and a memory device 216. The wearable device 204 is a computing system that is associated with the user 202 and/or worn by the user 202 and is linked to the interaction hub 208 or entity in order to monitor position, regulatory compliance, operational compliance, appointments, and the like of the user 202. The processing device 214 is operatively coupled to the communication device 212 and the memory device 216. The processing device 214 uses the communication device 212 to communicate with the network 201 and other devices on the network 201, such as, but not limited to the confirmation server 206, third party server 207, and the interaction hub 208. As such, the communication device 212 generally comprises a modem, server, or other device for communicating with other devices on the network 201.

The wearable device 204 comprises computer-readable instructions 220 and data storage 218 stored in the memory device 216, which in one embodiment includes the computer-readable instructions 220 of a user application 222.

In some embodiments, the user application 222 allows a user 202 to provide resource distribution vehicles, communicate with other user devices, provide authentication, and the like for the user 202.

As further illustrated in FIG. 1, the interaction hub 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the confirmation server 206, third party server 207, and the wearable device 204. As such, the communication device 246 generally comprises a modem, server, or other device for communicating with other devices on the network 201.

As further illustrated in FIG. 1, the interaction hub 208 comprises computer-readable instructions 254 stored in the memory device 250, which in one embodiment includes the computer-readable instructions 254 of a resource application 258. In some embodiments, the memory device 250 includes data storage 252 for storing data related to the system environment, but not limited to data created and/or used by the resource application 258.

As illustrated in FIG. 1, the confirmation server 206 is connected to the interaction hub 208 and wearable device 204 and is associated with a financial institution network. In this way, while only one confirmation server 206 is illustrated in FIG. 1, it is understood that multiple network systems may make up the system environment 200. The confirmation server 206 generally comprises a communication device 236, a processing device 238, and a memory device 240. The confirmation server 206 comprises computer-readable instructions 242 stored in the memory device 240, which in one embodiment includes the computer-readable instructions 242 of an institution application 244. The confirmation server 206 may communicate with the interaction hub 208, third party server 207, and the wearable device 204 for user 202 and user obligation and compliance.

The third party server 207 may have the same or similar devices as the wearable device 204, confirmation server 206, and/or the interaction hub 208 including a communication device, memory device, and processing device. The third party server 207 may be associated with merchants, third party financial institutions, or the like. The third party server 207 may be in communication with the other devices across the network 201 in order to complete the impetus resource distribution process confirmation.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a system diagram for a wearable device, in accordance with one embodiment of the present invention. The wearable device 301 generally includes an electronic device 300 portion that is configured to perform the communication and/or logic portions of the wearable device 301. The electronic device 300 may be, in whole or in part, coupled to, embedded in, placed in, and/or formed integrally with the other portions of the wearable device 301. The electronic device 300 includes, in various embodiments, a communication device 312, a user interface 314 for communication, and a memory device 316 for storing data and/or computer-executable program code. In various embodiments, the electronic device 300 includes a processing device 318, energy storage elements 320, a voltage regulator 322, and one or more level shifters 324. In some embodiments, the communication device 312 includes an antenna 311 and in some it includes a transceiver 313, wherein one or both of the antenna 311 and/or transceiver 313 are configured for short and/or long range communication. The communication device also includes readable indicia 309, which include but are not limited to a scanable code, a quick response (QR) code, image-readable code, a bar code, an image, picture, icon, or text, or the like, that is integrated with the electronic device 300 and its associated. The readable indicia 309 may be electronic or electronically produced via a user interface 314 (or more specifically a user output device 340 which includes a display device 342). In other embodiments, the readable indicia 309 is printed onto the wearable device 301 or is printed onto a sticker adhesive that is coupled to the wearable device 301. In some embodiments, the user interface 314 includes a user output device 340 having one or more of a display device 341, an auditory device 342, a vibratory device 343, some other output device or the like. In some embodiments, the user interface 314 includes a user input device 345 for receiving user input. In some embodiments, the memory device is configured to store computer-readable or computer-executable instructions and/or code. In the embodiment shown, the memory device 316 includes user access information 350, user rules 353, financial indicator 352 and an authentication/device-identifying information 351.

The user rules 353 include instructions for the user control rules such as user selected budgets, goals, or the like with respect to the user resource distributions. The financial indicator 352 includes instructions for indication of the user for communication with the user and devices on the network.

The authentication/device-identifying information 351 includes data and/or instructions regarding authenticating the user with another system or another wearable device. In other embodiments, the information 350 includes device-identifying information 351, such as, for example, an identifier identifying the wearable device 301. For example, in one embodiment, each wearable device 301 and/or each electronic device 300 is associated with an identification number used in communication with one or more other systems. In various embodiments, the wearable device 301 may or may not include some or all of the components and instructions/code shown. For example, in some embodiments, the wearable device 301 may or may not include a display. In other embodiments, for example, the wearable device 301 is watch or wearable electronic device. In various other embodiments, numerous combinations of the discussed components and/or instructions are included.

In some embodiments of the wearable device 301, the communication device 312 of the electronic device 300 is configured for receiving an external signal from a field (not shown), typically initiated at an external system. An external power source environment may include a field that, in various embodiments, is an electro-magnetic (EM) field, a radio frequency (RF) field, some other wireless communication field, or the like. The communication device 312 is also configured for converting the electro-magnetic signal to electrical power (i.e., an electrical signal) for powering the electronic device 300. A processing device 318 may be coupled (directly or indirectly) with the electrical signal of the communication device 312. The processing device 318 may generate one or more data signals, a portion of the data signals may be coupled with the user interface 314, and another (or the same) portion of the data signals may be coupled with the memory device 316. For example, the user interface 314, in one embodiment, receives power (directly or indirectly) from or derived from the electrical signal from the communication device 312. The memory device 316, in some embodiments, receives power (directly or indirectly) from or derived from the electrical signal from the communication device 312. Responsive to the signal from the field received by the electronic device 300, in some embodiments, data can be presented by the user interface 314, and the data stored by the memory device 316 can be changed.

In one example, the output of the communication device 312 is a voltage signal, such as a DC voltage, which may include but is not limited to a low voltage such as, for example, approximately 1.25 volts. In some embodiments, for example, the electronic device 300 includes a voltage regulator 322. The voltage regulator 322 is coupled with output of the communication device 312. The voltage regulator provides a stable or regulated output voltage for use by other components within the electronic device 300. For example, the voltage regulator 322, in one embodiment, includes circuit elements such as diodes, resistors, and/or capacitors for stabilizing the output signal received from the communication device 312. The voltage regulator 322, in some embodiments, is also configured for providing a regulating voltage to the other components within the electronic device 300. The voltage regulator 322, in some embodiments, includes other circuits and/or components configured for providing a regulated voltage and/or configured for stabilizing the voltage on the output of the voltage regulator 322.

The electronic device 300 includes or is coupled with one or more energy storage elements 320, also referred to as energy storage circuits, in some circumstances. The energy storage elements 320, in some embodiments, are coupled with the output of the communication device 312. In one embodiment, for example, the energy storage element 320 couples with the communication device output in order to store energy received from the communication device 312 and provide the energy to the input of the voltage regulator 322. Alternatively or additionally in various embodiments, energy storage elements 320 are coupled with the output of the voltage regulator 322 so as to store energy and provide energy to the components downstream of the voltage regulator 322 within the electronic device 300. The energy storage elements 320, in some embodiments, include capacitors, inductors, or other energy storage elements or circuits configured for providing energy storage.

In some embodiments, for example, one or more level shifters 324, also referred to as voltage conversion circuits or voltage translator circuits, are configured to provide or create the voltage levels utilized by the user interface 314 and/or by the memory device 316. In an alternative embodiment, a voltage regulator 322 is configured to provide multiple output voltage signals 332. In such an embodiment, each output voltage signal is a different voltage level in order to supply various voltage levels as required by multiple components of the electronic device 300, such as, for example, the processing device 318, the user interface 314, and/or the memory device 316 and/or other components. In some embodiments, the one or more level shifters 324 use other circuits and/or mechanisms configured for shifting a voltage signal.

In some embodiments, the communication device 312 receives a signal from the field generated by a communication device. In some embodiments, the signal from the field is converted into electric power having varying characteristics configured such that it can be utilized by the circuit components of the electronic device 300. The processing device 318 is activated by the electric power received from the field in some embodiments.

Referring again to the embodiment shown in FIG. 2, the processing device 318 is powered, for example, based on the energy received from an external source initiating the field. The processing device 318, in various embodiments, has one or more outputs. In one embodiment, for example, one or more outputs are coupled to the user interface 314 and provide control signals from the processing device 318 to the user interface 314. In some embodiments, the outputs include data signals and control signals, and in other embodiments, the outputs include only one or the other. In some embodiments, the outputs include control signals configured for controlling the memory device 316. The processing device 318, in some embodiments, includes other outputs which can be utilized to activate or de-activate other circuit elements within the electronic device 300, such as to selectively enable or selectively disable circuit sections of the electronic device 300 in order to conserve energy or efficiently utilize energy. The processing device 318 in various embodiments is compliant with the publicly available standards and/or specifications.

The user interface 314, in various embodiments, is collocated with the electronic device 300 on the wearable device 301, and in other embodiments, the user interface 314 is coupled with the electronic device 300 but is located separate from the electronic device 300 on or in the wearable device 301. In some embodiments, the display device 341 of the user interface 314 is or includes a persistent display which, once written, will display the desired data and will persistently maintain the display of that data until the display is re-written or otherwise changed. The display device 341, in some embodiments, is a fixed segment display, a dot matrix display, a positive or negative reflective display which can be read by the user or cardholder using ambient light, a liquid crystal display, or other display. In other embodiments, the display device 341 is a single indicator such as a light emitting diode (LED). In some embodiments, the display device 341 includes one or more indicators configured to provide different colors intended to communicate different messages to the user. In some embodiments, the wearable device 301 is configured for communicating information. In some such embodiments, the display device 341 includes one or more indicators configured for multiple color light, text, image, and the like emission. In various other embodiments, the wearable device 301 includes one or more additional indicator devices such as auditory devices 342, for example speakers and the like, and/or vibratory devices 343.

In various embodiments of the wearable device 301, the wearable device 301 is configured for wearing on various body such as the wrist or ankle or the like. In some embodiments, the wearable device 301 is or includes a charm wearable on a chain around the neck, ankle or wrist or is or includes a necklace. In other embodiments, the wearable device 301 is or includes one or more rings, a wristwatch or incorporated into a wristwatch, eyeglass rims, eyeglasses, such as embedded in and/or on eyeglass lenses, contact lenses, shoes, purse, wallet, a cap, a hat, a visor, a shoelace, a button, a belt, a belt buckle, an implant, or some other clothing accessory or personal accessory worn or carried on a user's person.

FIG. 3 provides a high live process flow illustrating the impetus resource distribution process confirmation 100, in accordance with one embodiment of the present invention. As illustrated in block 102, the process 100 continues by identifying a wearable device associated with a user. In this way, the user may opt-in to the system and provide system access to the wearable device associated with the user. In this way, the system, based on user opt-in is granted access to the wearable device via integration within the wearable device. As such, the system may gain access to user physiological data extractable from the user device.

In some embodiments, the system may monitor the wearable device to identify a baseline physiological data for the user. In this way, the system may identify a baseline for the physiological data of a user, such as the normal or standard user physiological attributes.

Along with integration within a wearable device, the system may integrate with user resource distribution vehicles. The user resource distribution vehicles include mobile wallets, credit cards, debit cards, or the like that the user may utilize to provide resource distributions for a product or service.

As illustrated in block 104, the process 100 continues by identifying an activation of a user resource distribution vehicle. In this way, the system may identify that a user is at a merchant location or online and is initiating an activation of the user resource distribution vehicle to complete a transaction. The system may identify the activation by a merchant or third party system, the user, or by the integration within the resource distribution vehicle.

As illustrated in block 106, the process 100 continues by extracting, in real-time as the activation is occurring, physiological response data from the wearable device associated with the user. In this way, the system may identify the physiological response data of the user during the initiation of the resource distribution.

In some embodiments, the system may be able to identify audio queues from the wearable device that may include audio sounds from the user or from individuals associated with the user to identify a level of discrepancy between or impetus associated with the user.

The system may then compare the physiological response data associated with the activation to a baseline physiological response of the user, as illustrated in block 108. In this way, the system may identify if there is a discrepancy in the physiological data associated with the user during the activation of the user resource distribution vehicle. As such, the system may determine if there is a discrepancy between a baseline and a potential impetus resource distribution for an impulse product or service purchase. Furthermore, the system may compare the activation to user control rules. The user control rules may be user or system pre-determined rules for resource distributions based on an amount, time of day, or the like associated with the resource distribution vehicle activation.

In some embodiments, if no discrepancy exists between the physiological response data associated with the activation to a baseline physiological response and/or all the user control rules are satisfied, the system may allow for transaction completion using the user resource vehicle.

In some embodiments, if a discrepancy is illustrated between the physiological response data associated with the activation to a baseline physiological response and/or the user control rules are triggered, the process 100, as illustrated in block 110, may continue by triggering a process confirmation action based on an identified discrepancy between the physiological data and/or the user control rules that require an action response before continued processing of the resource distribution. In this way, if the discrepancy reaches a specific threshold or triggers a user control rule, the system triggers a process confirmation action. The process confirmation action may require the user to input a passcode or the like via a user device in order to continue the resource distribution. In other embodiments, the process confirmation action may require an authorized user other than the user to input a passcode or the like. In some embodiments, the process confirmation may be a tiered based on the level of discrepancy, the higher level of discrepancy, the more likely an authorized user other than the user may be required to authorize the resource distribution.

As illustrated in block 112, the process 100 is completed by learning user resource distribution activation and confirmation strategy over time for feedback and medication of user control rules and baseline physiological responses. In this way, the system includes a machine learning system for the learning of user resource distribution activation and confirmation strategy over time for feedback and modification of user control rules and baseline physiological response. As such, in this way the system learns from user historic transactions and user resource goals to determine the user strategy and tailors the user control rules and physiological response based on the projected future of the user.

FIG. 4 provides a high level process flow illustrating crating a baseline physiological resource database 500, in accordance with one embodiment of the present invention. As illustrated in block 502, the process 500 is initiated by creating a baseline physiological response databased. The first step, as represented by block 504 is to collect historical physiological activity data. For example, in one embodiment, historical physiological activity data is collected by one or more physiological sensors associated with the wearable device associated with the user.

Furthermore, the baseline data may include audio sounds typical of the user and user environment, such as individuals typically around the user. As such, the system may be able to identify audio queues from the wearable device that may include audio sounds from the user or from individuals associated with the user to identify a level of discrepancy between or impetus associated with the user.

Furthermore, as illustrated in block 506, the process 500 continues by collecting of historical global positioning data. Global positioning data represents the location of the user based on location of the user device and/or a wearable device associated with the user.

As represented by block 508, in various other embodiments, historical temporal data may be collected for the baseline data. In some embodiments the historical temporal data may include a data, day of week, day of month, time of day and the like associated with the user resource distribution. This temporal data represents, similar to the global positioning data, is useful in that it can assist the system in determining the user baseline physiological response database. For example, in one embodiment, where historical temporal data is collected, a user has a habit of purchasing an item in the morning regularly. The user, in this example, has made a decision that the user, as a general goal, does not want to purchase those items any longer in order to save money. In this example, the historical temporal data, which will be correlated with historical financial data as discussed below will indicate to the system the exact dates, times, and the like that the user makes various resource distributions.

Next, as represented by block 510, historical resource distribution data or financial activity data is collected. For example, in some embodiments, transaction data such as data regarding one or more historical automated teller machine (ATM) transactions, debit transactions, credit transactions, and/or online transactions including online banking transaction and online merchant transactions, and the like, is collected. The collected historical financial activity data typically includes type and amount of purchases, time of purchase, and includes, in some embodiments, data indicating the merchant from which a purchase was made, and in some embodiments, data including the category of the merchant from which the purchase was made. For example, in some embodiments, a user purchases a child toy from a child toy store, and the historical data collected includes data indicating the type of purchase, that is, a child toy in this case; data indicating the quantity of the purchase, that is, one in this case; data indicating the amount of the purchase and data indicating the category of merchant from which the purchase was made, that is, a toy store in this case. In various embodiments, numerous different combinations of data fields are collected and subsequently manipulated such as by correlation and distillation as discussed below. In some embodiments, the system receives input from the user regarding some or all the resource distribution data.

As illustrated in block 512, the data is combined and processed via machine learning to determine the user resource distribution history and a baseline physiological response to store in the baseline physiological response databased for the user and how the user may react physiologically to an impetus resource distribution. The baseline physiological response pattern represents combinations of physiological data. In some embodiments, the baseline physiological response database also includes global positioning data, and temporal data about user standard and uncharacteristic resource distributions. The excited behavior patter represents combination of variables, that is, combination of physiological data, global positioning data, and temporal data where the user was more vulnerable to undesired financial behavior. Of course, without taking into account the historical financial data, in some cases, it may be difficult to discern the distinction between the baseline behavior pattern and the excited behavior pattern.

FIG. 5 provides a high level process flow illustrating creating a baseline user control rule database 550, in accordance with one embodiment of the present invention. As illustrated, the system may include a baseline user control rule database that may be created, as illustrated in block 552. The user control rule database may comprise a collection of historical resource distributions of the user, as illustrated in block 554. This information includes, for example, in some embodiments, information regarding impulse purchases, spending categories, budget thresholds, historic distributions, specific merchants and/or categories of merchants, and the like. In some embodiments, the system may extract the resource distribution data. In some embodiments the user may provide the resource distribution data.

As illustrated in block 556, the system may receive information from the user defining modifications to the user's resource distributions. In this way, the system may identify modifications the user is desiring to make with respect to resource distribution. Furthermore, the system may identify and receive information from the user defining resource distribution goals 555. In this way, the system may receive resource distribution goals, budgets, or the like for the user. As such, the system may identify and recognize if a resource distribution is an impetus one or one that is in line with the user's resource distribution habits and goals.

These user inputs thereby establishing a threshold. In some embodiments, when the system process is applied during assessment as indicated by the wearable device, the system may require the user to provide additional authentication prior to the completion of the current transaction.

Finally, as illustrated in block 560, the process 500 is completed by utilizing the received information and continued user resource distribution and process it through machine learning in order to identify and modify user rules based on user trends in resource distribution. As such, the system provides a feedback loop for continually monitoring and processing of resource distributions and user trends associated with the same.

FIG. 6 provides a process map illustrating the impetus resource distributing confirmation process 700, in accordance with one embodiment of the present invention. As illustrated in block 704, the process 700 is initiated by identifying an activation of a resource distribution vehicle associated with the user. In this way, the system may be linked to various resource distribution vehicle systems or third party systems hosting the user resource distribution vehicles. Activation may be at a merchant location or otherwise where the user is initiating the purchase of a product or a service. Along with receiving the information about the activation, the system may extract activation terms about the transaction associated with the activation. This may include a merchant location, products associated with the transaction, a time of the transaction, and an overall resource distribution amount associated with the transaction.

Upon indication of the activation of a resource distribution vehicle, the system may extract physiological data from a wearable device associated with the user. In this way, the system extracts real-time physiological data at the point of resource distribution vehicle activation. The real-time physiological data is compared to the baseline physiological data previously collected for the user, as illustrated in block 706.

In some embodiments, the system may be able to identify audio queues from the wearable device that may include audio sounds from the user or from individuals associated with the user to identify a level of discrepancy between or impetus associated with the user.

In addition to comparing the real-time physiological of the user to a baseline physiological data point, the system may also compare the activation terms to user control rules, as illustrated in block 708. As such, the system may identify if the transaction meets the user's goals, budgets, or other resource distribution modifications the user desires to achieve. In this way, the system compares the activation terms to the user control rules to see if the pending transaction is within the user's set parameters.

As illustrated in block 710, the system identifies if there is any discrepancy between the baseline physiological data and the real-time physiological data and/or any discrepancy between the current activation terms and the user control rules. If there is no discrepancy and the thresholds are satisfied, the system allows for the resource distribution to be processed without additional authentication or steps, as illustrate in block 712.

However, if there id a discrepancy in block 710 between the baseline physiological data and the real-time physiological data and/or any discrepancy between the current activation terms and the user control rules, the process 700 continues by identifying a level of discrepancy, as illustrated in block 714. Based on the level of discrepancy, the system may implement various levels of authorization action response requirements to the user or to a user representative. As such, as illustrated in block 716, the process 700 continues by transmitting the necessary level of authorization action response to the appropriate device and appropriate user based on that level of discrepancy identified. In this way, the system transmits an alert that requires the user to access the alert and perform an action prior to allowing the processing of the resource distribution. The action may include a spectrum of different requirements increasing in difficultly based on an increase in the level of discrepancy. It may require the user to tap or otherwise engage the user's wearable device, it may require the user to access the alert or action via a separate user device, it may require the user to input an authorization password, or it may require a user representative to perform an action.

As illustrated in block 718, if an action response is received within an allotted time, the system allows for transmission of the resource distribution to complete the transaction, as illustrate in block 722. If the action response is not received with an allotted time or is incorrect, the system may deny transmission of the resource distribution, as illustrated in block 720.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for impetus resource distribution process confirmation comprising:
   at least one non-transitory storage device; and
   at least one processor coupled to the at least one non-transitory storage device, wherein the at least one processor is configured to:
      identify and integrate within a deployed wearable device on a user;
      identify and integrate within user resource distribution vehicles;
      synchronize the deployed wearable device and the user resource distribution vehicles;
      identify activation of one of the user resource distribution vehicles;
      extract physiological response data from the deployed wearable device on the user in real-time as activation of the user resource distribution vehicle is occurring;
      compare the extracted physiological response data to a baseline physiological response data to determine a discrepancy;
      compare the activation of the user resource distribution vehicles to user control rules;
      trigger a process confirmation confirming the activation based on a discrepancy between the comparisons;

require confirmation for completion of resource distribution via the user resource distribution vehicle; and
build learned user resource distribution platform based on machine learning composition of the activation and confirmation over a period of time.

2. The system of claim 1, wherein identifying and integrating within the deployed wearable device on the user further comprises generating a baseline of physiological responses of the user based on sensors associated with the wearable device.

3. The system of claim 1, wherein identifying and integrating within the deployed wearable device on the user further comprises requiring the user to opt-in for the identification.

4. The system of claim 1, wherein the user control rules further comprise user pre-set rules including a threshold resource distribution amount or a time of day for the activation for triggering process confirmation.

5. The system of claim 1, wherein the build learned user resource distribution platform further comprises creation of a threshold discrepancy differences between the comparisons that triggers the required confirmation and wherein the build learned user resource distribution platform further comprises creation of the user control rules.

6. The system of claim 1, wherein identifying activation of one of the user resource distribution vehicles further comprises identifying deployment of the user resource distribution vehicle at a merchant for completing a transaction for a product or service and information about the transaction including a resource distribution amount, a location, and a time of the activation.

7. The system of claim 1, wherein the user control rules further comprise system pre-set rules based on user resource allocation and user resource distribution requirements.

8. The system of claim 1, wherein the wearable device further comprises deploying an electronic watch with an interactive interface for communication.

9. A computer program product for impetus resource distribution process confirmation, the computer program product comprising a non-transitory computer-readable medium causing an apparatus to:
identify and integrate within a deployed wearable device on a user;
identify and integrate within user resource distribution vehicles;
synchronize the deployed wearable device and the user resource distribution vehicles;
identify activation of one of the user resource distribution vehicles;
extract physiological response data from the deployed wearable device on the user in real-time as activation of the user resource distribution vehicle is occurring;
compare the extracted physiological response data to a baseline physiological response data to determine a discrepancy;
compare the activation of the user resource distribution vehicles to user control rules;
trigger a process confirmation confirming the activation based on a discrepancy between the comparisons;
require confirmation for completion of resource distribution via the user resource distribution vehicle; and
build learned user resource distribution platform based on machine learning composition of the activation and confirmation over a period of time.

10. The computer program product of claim 9, wherein identifying and integrating within the deployed wearable device on the user further comprises generating a baseline of physiological responses of the user based on sensors associated with the wearable device.

11. The computer program product of claim 9, wherein identifying and integrating within the deployed wearable device on the user further comprises requiring the user to opt-in for the identification.

12. The computer program product of claim 9, wherein the user control rules further comprise user pre-set rules including a threshold resource distribution amount or a time of day for the activation for triggering process confirmation.

13. The computer program product of claim 9, wherein the build learned user resource distribution platform further comprises creation of a threshold discrepancy differences between the comparisons that triggers the required confirmation and wherein the build learned user resource distribution platform further comprises creation of the user control rules.

14. The computer program product of claim 9, wherein identifying activation of one of the user resource distribution vehicles further comprises identifying deployment of the user resource distribution vehicle at a merchant for completing a transaction for a product or service and information about the transaction including a resource distribution amount, a location, and a time of the activation.

15. The computer program product of claim 9, wherein the user control rules further comprise system pre-set rules based on user resource allocation and user resource distribution requirements.

16. The computer program product of claim 9, wherein the wearable device further comprises deploying an electronic watch with an interactive interface for communication.

17. A method for impetus resource distribution process confirmation, the method comprising:
identifying and integrating within a deployed wearable device on a user;
identifying and integrating within user resource distribution vehicles;
synchronizing the deployed wearable device and the user resource distribution vehicles;
identifying activation of one of the user resource distribution vehicles;
extracting physiological response data from the deployed wearable device on the user in real-time as activation of the user resource distribution vehicle is occurring;
comparing the extracted physiological response data to a baseline physiological response data to determine a discrepancy;
comparing the activation of the user resource distribution vehicles to user control rules;
triggering a process confirmation confirming the activation based on a discrepancy between the comparisons;
requiring confirmation for completion of resource distribution via the user resource distribution vehicle; and
building learned user resource distribution platform based on machine learning composition of the activation and confirmation over a period of time.

18. The computer-implemented method of claim 17, wherein identifying and integrating within the deployed wearable device on the user further comprises generating a baseline of physiological responses of the user based on sensors associated with the wearable device.

19. The computer-implemented method of claim 17, wherein the user control rules further comprise user pre-set rules including a threshold resource distribution amount or a time of day for the activation for triggering process confirmation.

20. The computer-implemented method of claim 17, wherein the build learned user resource distribution platform further comprises creation of a threshold discrepancy differences between the comparisons that triggers the required confirmation and wherein the build learned user resource distribution platform further comprises creation of the user control rules.

* * * * *